(12) United States Patent
Needham et al.

(10) Patent No.: US 8,930,266 B2
(45) Date of Patent: Jan. 6, 2015

(54) TECHNIQUES FOR PROGRESSIVE PURCHASING

(75) Inventors: Paul Needham, Vancouver (CA); Michael MacHarg, San Francisco, CA (US); Jacob Winiecki, Brooklyn, NY (US)

(73) Assignee: Simpa Networks, Inc., San Francisco, CA (US)

(*) Notice: Subject to any disclaimer, the term of this patent is extended or adjusted under 35 U.S.C. 154(b) by 189 days.

(21) Appl. No.: 13/101,722

(22) Filed: May 5, 2011

(65) Prior Publication Data

US 2011/0288992 A1     Nov. 24, 2011

Related U.S. Application Data

(60) Provisional application No. 61/469,564, filed on Mar. 30, 2011, provisional application No. 61/347,781, filed on May 24, 2010.

(51) Int. Cl.
    *G06Q 40/00*     (2012.01)

(52) U.S. Cl.
    USPC .......................................................... 705/39

(58) Field of Classification Search
    USPC ................................................... 705/35–45
    See application file for complete search history.

(56) References Cited

U.S. PATENT DOCUMENTS

| | | | |
|---|---|---|---|
| 6,157,313 A | 12/2000 | Emmermann | |
| 6,314,169 B1 | 11/2001 | Schelberg, Jr. et al. | |
| 6,356,881 B1 | 3/2002 | Milch et al. | |
| 7,509,190 B2 | 3/2009 | Emery et al. | |
| 7,565,227 B2 | 7/2009 | Richard et al. | |
| 7,620,162 B2 | 11/2009 | Aaron et al. | |
| 7,801,771 B1 | 9/2010 | Sirota et al. | |
| 7,844,499 B2 | 11/2010 | Yahiro et al. | |
| 7,860,764 B1 | 12/2010 | Alexander et al. | |
| 2002/0123964 A1 | 9/2002 | Kramer et al. | |
| 2004/0130292 A1* | 7/2004 | Buchanan et al. | 320/116 |
| 2004/0150384 A1* | 8/2004 | Holle et al. | 324/110 |
| 2004/0205032 A1 | 10/2004 | Routtenberg et al. | |
| 2005/0143941 A1 | 6/2005 | Forth et al. | |
| 2006/0019632 A1* | 1/2006 | Cunningham et al. | 455/408 |
| 2006/0026027 A1 | 2/2006 | Cooley, Jr. et al. | |
| 2006/0149691 A1* | 7/2006 | Sindambiwe | 705/412 |
| 2006/0165005 A1 | 7/2006 | Frank et al. | |
| 2006/0230394 A1 | 10/2006 | Forth et al. | |
| 2007/0061268 A1 | 3/2007 | Herold et al. | |
| 2007/0083479 A1 | 4/2007 | Swartz et al. | |
| 2007/0136083 A1 | 6/2007 | Simon et al. | |
| 2007/0150366 A1 | 6/2007 | Yahiro et al. | |

(Continued)

FOREIGN PATENT DOCUMENTS

| | | |
|---|---|---|
| EP | 1533729 A1 | 5/2005 |
| JP | 2002-132369 | 5/2002 |

*Primary Examiner* — Robert R Niquette
*Assistant Examiner* — Chia Yi Liu
(74) *Attorney, Agent, or Firm* — Kilpatrick Townsend & Stockton LLP

(57) ABSTRACT

Techniques for progressive purchasing of a device are disclosed. In one embodiment, a method for progressive purchasing of a device includes receiving information indicating a payment for a device from a customer, determining a payment pattern by the customer based on a recorded customer payment history and the received information, identifying a functionality to be enabled in the device based on the determined payment pattern, and enabling the identified functionality. The identified functionality is selected from a plurality of functionalities associated with the device.

7 Claims, 7 Drawing Sheets

(56) References Cited

U.S. PATENT DOCUMENTS

| | | |
|---|---|---|
| 2007/0239842 A1 | 10/2007 | Knowles et al. |
| 2008/0177678 A1 | 7/2008 | Di Martini et al. |
| 2008/0195561 A1 | 8/2008 | Herzig |
| 2009/0014460 A1* | 1/2009 | Kobus et al. .................. 221/135 |
| 2009/0040029 A1 | 2/2009 | Bridges et al. |
| 2009/0058676 A1 | 3/2009 | Orlosky |
| 2009/0132362 A1* | 5/2009 | Fisher et al. .................... 705/14 |
| 2009/0157529 A1 | 6/2009 | Ehlers et al. |
| 2009/0157545 A1 | 6/2009 | Mobley |
| 2009/0182605 A1 | 7/2009 | Lappas et al. |
| 2009/0234750 A1 | 9/2009 | Arfin |
| 2009/0234757 A1 | 9/2009 | Tarbell et al. |
| 2010/0263660 A1 | 10/2010 | Thorne |
| 2011/0047048 A1 | 2/2011 | Yahiro et al. |

\* cited by examiner

TECHNIQUES FOR PROGRESSIVE PURCHASING

This application claims priority from U.S. Provisional Application No. 61/347,781 filed May 24, 2010 and U.S. Provisional Application No. 61/469,564 filed Mar. 30, 2011.

BACKGROUND OF THE INVENTION

Worldwide, approximately 1.6 billion people have no access to electricity and another 1 billion have extremely unreliable access. Without reliable access to electricity, the poor depend primarily on kerosene-fueled lanterns, candles and battery-powered flashlights for their lighting needs. Access to lighting is extremely important for a family's quality of life, health, safety, educational achievements, and economic livelihood. "Base of the economic Pyramid" (BoP) Consumers worldwide spend about $38 billion per year on kerosene for light. At the household level it is common to spend 10-30% of household income on lighting. Additionally, nearly 500 million people worldwide have a mobile connection but no access to the electricity grid. In most areas, these types of users have to walk long distances to access charging services in the nearest market centers connected to the grid.

Modern power energy systems configured to power single- and multiple-family households, such as, for example, solar power systems have proven to be very desirable for customers all over the world. The solar power systems range from small hand-held solar powered lanterns that replace a single kerosene lamp to fixed larger multi-light solar home systems which can meet multiple household energy needs. However, large scale adoption of power systems such as solar systems has been slow primarily because consumers cannot afford the high up-front cost of purchasing a power energy system or do not have access to affordable financing options. Furthermore, safe, high-quality, low-cost and accessible credit that is needed to match household incomes that are low, irregular, and often unpredictable is typically not available. Accordingly, wide distribution of power energy systems configured for single- and multiple-family households has been so far hindered or almost non-existent.

SUMMARY

Techniques including methods and apparatuses configured to facilitate progressive purchasing of various electric and electronic devices are described. The techniques utilize an apparatus consisting of both hardware and software components and a computer-implemented payment method enabling a customer to progressively purchase a device, over time, through usage.

In one embodiment, a system for progressive purchasing may include an apparatus, hereinafter called the Usage Regulator, configured to regulate the usage of electronic components of a Device in accordance with a fulfillment of a predetermined purchase plan. In short, the Usage Regulator may be configured to turn on or off certain features and functionality of a Device and can make certain features and functionality more or less available to the user in accordance with the purchase plan configured for the user. Information, including customer data or transaction history, may be processed by a system component referred to hereinafter as a Revenue Management System (RMS) that may not be located within the Usage Regulator. In one embodiment, the RMS may be implemented as a software component stored on a computer-readable medium and executable on a computing device.

Information is transmitted between the RMS and the Usage Regulator in the form of User Requests and Payment Codes. User Requests are communications initiated by customers and sent to the Revenue Management System. The RMS receives User Requests from either customers or vendors. There are various forms of User Requests distinguished by the type of information and instructions contained in the request. In one embodiment, User Requests may take the form of an Activation Request, a Recharge Request, or a Reset Request.

In response to the receipt of a User Request the RMS may process the User Request and transmit encrypted Payment Codes back to the user and/or directly to the Usage Regulator. Payment Codes are intended to elicit modification of the Device's state. A Payment Code conveys to the Usage Regulator that a change in the Usage Regulator operation is required, for example, turning on or off certain features and functionality of the regulated Device.

DETAILED DESCRIPTION OF THE INVENTION

Techniques including methods and apparatuses configured to facilitate progressive purchasing of various electric and electronic devices will be described herein.

Figure 1:
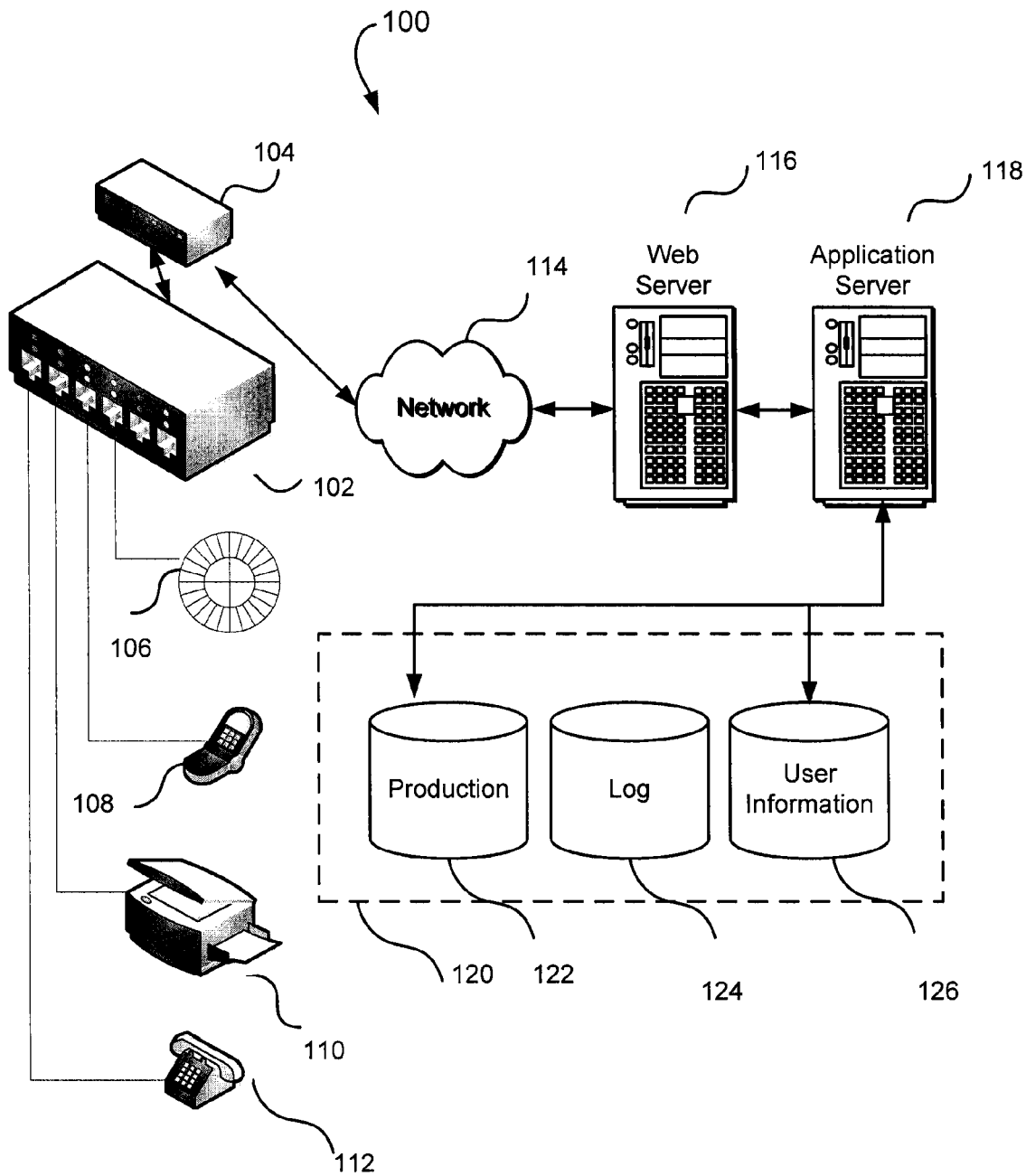
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic Device 102. "Device" refers to any device, such as, for example (but not limited to), a radio, television, personal computer, mobile phone, solar energy system, electric water pump, utility (water, gas, electricity) regulator, and the like. The Device 102 may be associated with Usage Regulator 104 to operably control the Device 102 (e.g., by enabling and disabling the Device's components or features) and to send and receive requests, messages, or information over an appropriate network 114 and convey information back to the Device. The Usage Regulator will be described below in greater detail.

In one embodiment, the Device 102 may be connected to, and provide power for, a plurality of client devices 106-112. Examples of such client devices include personal computers, cell phones, handheld messaging devices, laptop computers, set-top boxes, personal data assistants, electronic book readers, lamps, household appliances, and the like.

The network 114 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 116 for receiving requests and serving content in response thereto, although for other networks, an alternative device serving a similar purpose could be used, as would be apparent to one of ordinary skill in the art.

The illustrative environment includes at least one application server 118 and a data store 120. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment.

The application server can include any appropriate hardware and software for integrating with the data store as needed to execute aspects of one or more applications for the client device, handling a majority of the data access and business logic for an application. The application server provides access control services in cooperation with the data store, and is able to generate data such as text, graphics, audio, and/or video to be transferred to a customer, which may be served to the viewer by the Web server in the form of HTML, XML, or another appropriate structured language in this example. The handling of all requests and responses, as well as the delivery of information between the Device 102 and the application server 118, can be handled by the Web server. It should be understood that the Web and application servers are not required and are merely example components, as structured code discussed herein can be executed on any appropriate device or host machine as discussed elsewhere herein.

The data store 120 can include several separate data tables, databases, or other data storage mechanisms and media for storing data relating to a particular aspect. For example, the data store illustrated includes mechanisms for storing production data 112 and user information 126, which can be used to serve content for the production side. The data store also is shown to include a mechanism for storing log data 124, which can be used for reporting, generating statistics, and other such purposes. It should be understood that there can be many other aspects that may need to be stored in the data store, such as Device access right information, which can be stored in any of the above-listed mechanisms as appropriate or in additional mechanisms in the data store 120. The data store 120 is operable, through logic associated therewith, to receive instructions from the application server 118 and obtain, update, or otherwise process data in response thereto. In one example, a customer might submit a request for a certain type of service associated with the Device 102. In this case, the data store might access the user information to verify the identity of the viewer, and can access the catalog detail information to obtain information about items of that type. The information then can be returned to the customer that the customer will be able to view on the Usage Regulator 104.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

Figure 2:
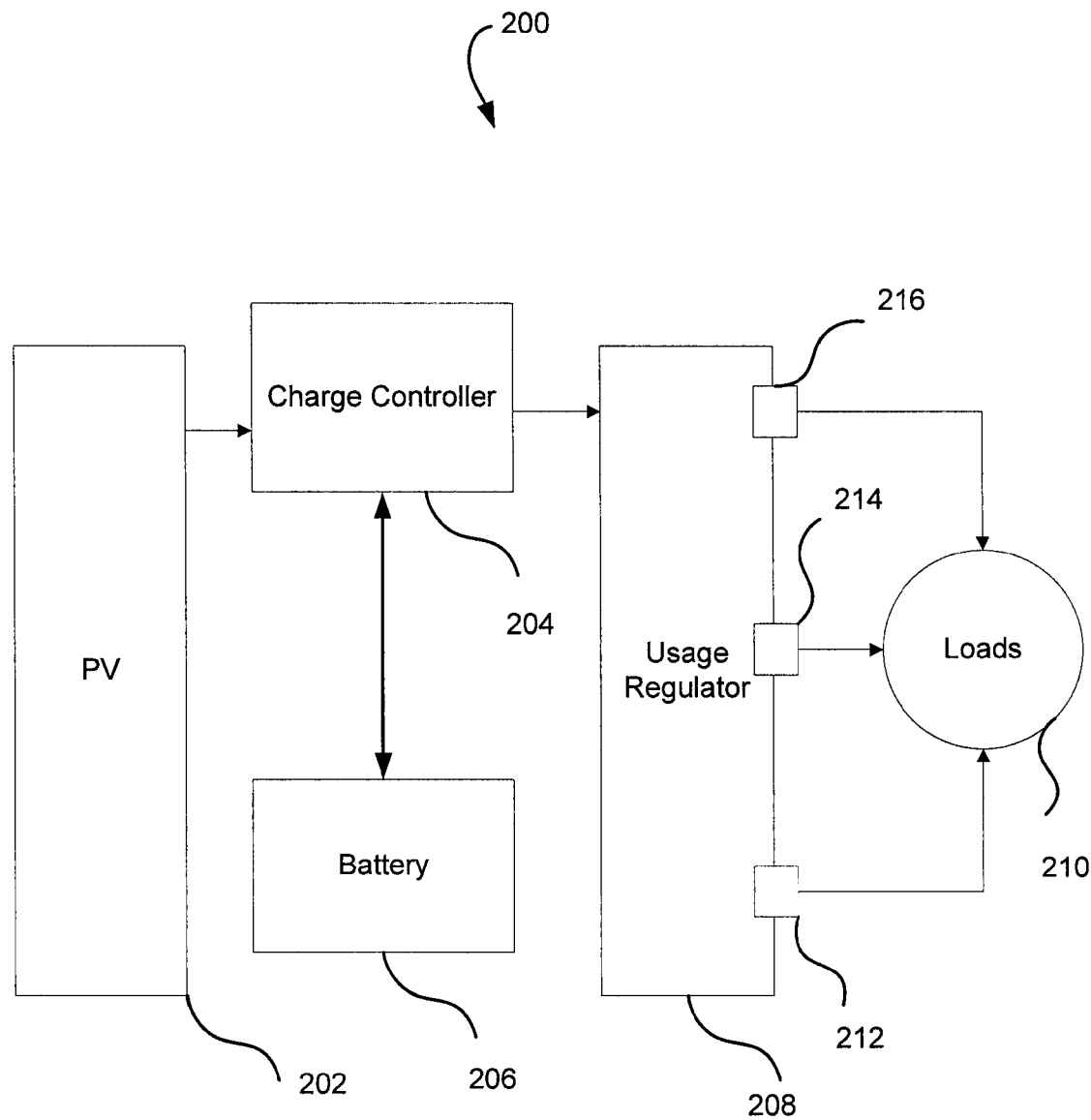
FIG. 2 is a diagram illustrating an example of a solar power system utilized in accordance with an embodiment.

FIG. 2 illustrates an example of the Device 102, specifically, a solar power system. Solar power is the conversion of sunlight into electricity, often directly by using photovoltaic devices (PV). PV converts light into electric current using the photoelectric effect. A typical solar power system 500 includes, but is not limited to, a photovoltaic panel PV 202 which converts sunlight into electric power. The PV 202 may comprise a packaged interconnected assembly of solar cells, also known as photovoltaic cells. The PV 202 can be used as a component of a larger solar power system such as described herein to generate and supply electricity in commercial and residential applications. Because a single solar panel can only produce a limited amount of power, many installations contain several panels. Thus, a photovoltaic device such as PV 202 may include an array of solar panels. The system 200 may further include a charge controller 204 which regulates the flow of electricity in and out of a battery 206 configured to accumulate and distribute the electric power provided by the PV 202. All elements of the system may be connected through interconnection wiring.

In one embodiment, a regulator 208, such as the Usage Regulator 104 described above, provides electric power produced by the system 200 to one or more loads 210, such as client devices 106-112 described in reference to FIG. 1. The electric power may be provided to the loads 210 through one or more output ports 212, 214, and 216 associated with, and controlled by, the Usage Regulator. In one embodiment, the techniques described herein may regulate the selection and number of ports allowed to provide power to loads, the amount of power (e.g., W) or energy (e.g., Wh) provided at each port, the times of day that power or energy is provided at each port, and the like. The above variations may be controlled based on a set of business rules that may be applied generally or may be "tailored" to a particular customer. Examples of business rules (functionalities) that could be applied in the specific context of an energy system include but are not limited to the following:

The Usage Regulator may enable only one of a plurality (e.g., four) available ports, for a maximum current draw at a predetermined power level (e.g., 2 A) and for no more than a predetermined time period (e.g., 2 hours).

The Usage Regulator may enable only one of the plurality available ports for a maximum current draw at a predetermined level (e.g., 4 A), but for no more than a predetermined level of energy (e.g., 60 Wh).

The Usage Regulator may enable one port for maximum current draw at a first predetermined level (e.g., 5 A) and another port for maximum current draw at a second predetermined level (e.g., 10 A).

The Usage Regulator may enable all ports for a combined maximum current draw at a predetermined level (e.g., 20 A).

The Usage Regulator may enable all ports for a combined maximum current draw at a predetermined level of power (e.g., 25 A) for the energy at a predetermined level (e.g., 2000 Wh).

The Usage Regulator may enable different types of ports, for example, all DC ports and one AC port.

The Usage Regulator may enable one or more ports only after outside ambient light, as sensed via the PV panel, falls below a predetermined level.

The Usage Regulator may enable one or more ports only for a predetermined time period, e.g., from 5 pm to 7 am.

The business rules described above may apply to a particular customer or group of customers based on one or more conditions (criteria). These conditions typically reflect customer behavior, for example, with regard to providing payments for the Device and may include one or more of the following: the frequency of payments by a customer, the sum total of payments received from the customer, the pattern of payments received from the customer, and the like. For example, when a customer paid off the whole amount charged for the Device, all ports in the Device will be enabled. In another example, when a customer paid the requested amount timely at least once, one or more of the above-listed rules may apply (e.g., one of the ports will be enabled).

If a customer paid the required amounts at required times, i.e., with required frequency, one or more of the above listed rules may apply (e.g., one port for maximum current draw of a first predetermined level and another port for maximum current draw of a second predetermined level may be enabled). Furthermore, if a customer referred another prospective customer who subsequently signed up for the service, one or more of the above-listed rules may apply (e.g., all ports will be enabled for a combined maximum current draw at a predetermined level of power for the energy at a predetermined level. In general, different conditions based on a particular customer behavior may determine application of a particular business rule (or a set of rules) in regard to enabling particular functions of the Device.

Figure 3:
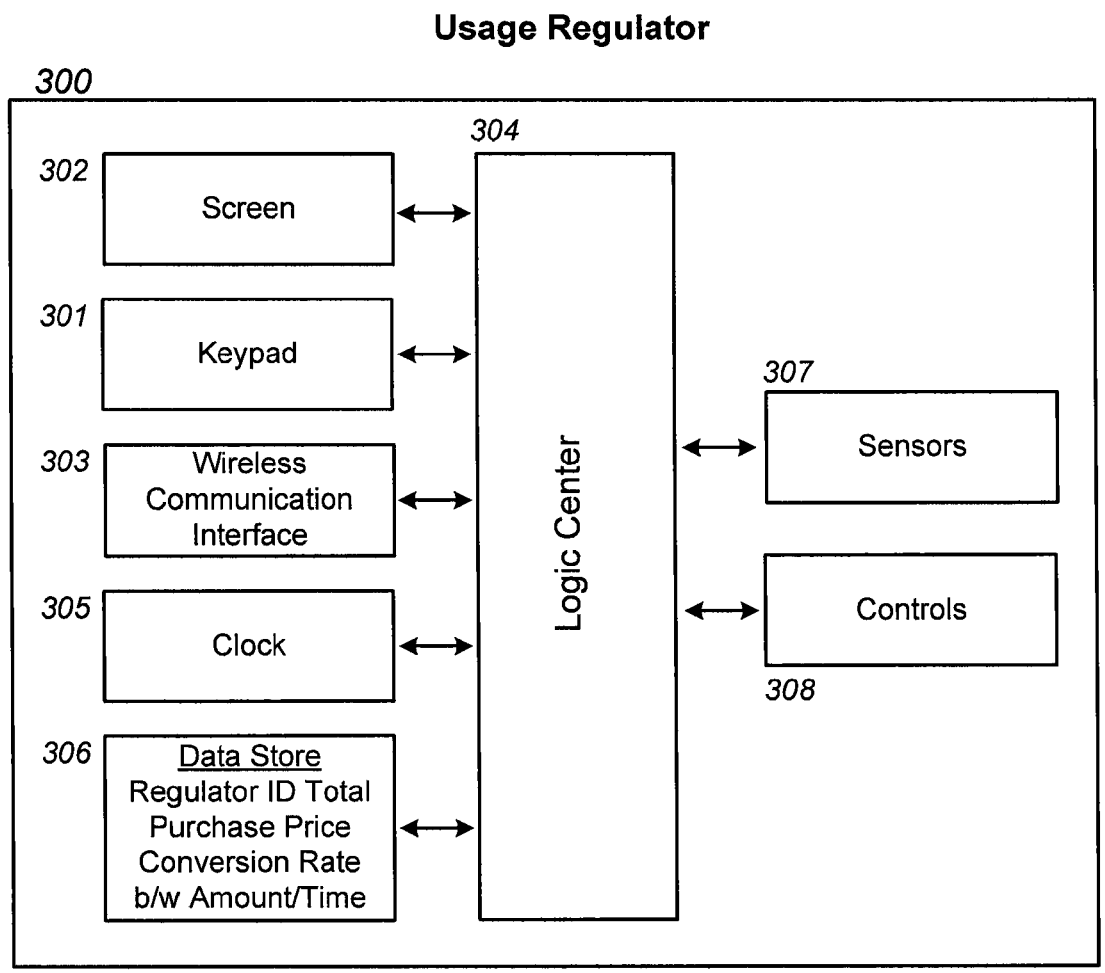
FIG. 3 is a diagram illustrating a Usage Regulator according to an embodiment.

FIG. 3 is a block diagram illustrating a Usage Regulator according to an embodiment. The Usage Regulator 300 shown in FIG. 3 may be composed of one or more of the following key components: a Regulator Keypad (box 301), Regulator Screen (box 302), a Wireless Communications Interface (box 303), a computer logic center (box 304), a clock (box 305), a data store (box 306), sensors (box 307), and controls (box 308). Each Usage Regulator may be uniquely identified by a Device ID. The Usage Regulator interfaces with other electronic components of the Device and is able to regulate the functioning of the various features of the Device with which a Usage Regulator is associated.

The Regulator Keypad (box 301) is an input device allowing a user to enter information to be processed by the Usage Regulator. The Regulator Screen (box 302) is a display providing information to the user. The Wireless Communications Interface (box 303) is an input-output interface allowing the Usage Regulator to communicate over a wireless network with the Revenue Management System.

The computer logic center (box 304) is a microprocessor containing a stored program logic receiving inputs and providing outputs to the other components of the Revenue Management System. The clock (box 305) is a clock for keeping time. The data store (box 306) is a digital memory system, in an embodiment a flash memory storage, where various data is stored for the correct operation of the Usage Regulator. The sensors (box 307) measure the use of particular features of the Device. In an embodiment, the sensors measure the amount of electricity drawn from a solar power system. The controls (box 308) enable or disable the use of particular features of the Device as discussed above in reference to FIG. 2. In an embodiment, the controls enable or disable the ability to draw electricity from a solar power system. For example, the Usage Regulator could disable or enable the utility of the Device to the user for a period of time. In an embodiment, the Usage Regulator could enable certain features and/or disable others.

The Usage Regulator can be applied to, but is not limited to usage of: electricity, water, fossil fuels, or any continuously metered consumable or service. The Usage Regulator can be applied to any electronic Device, metering and enabling or disabling one or more feature of that Device. The Usage Regulator regulates the provision of services to the Customer in response to Payment Codes it receives via the Regulator Keypad or via the Wireless Communications Interface and based upon the interpretation of those Payment Codes according to an encryption/decryption algorithm, data stored within the Usage Regulator, and the Revenue Management System.

There are many types of Payment Codes distinguished by the type of information and instructions contained. A Payment Code may comprise a string of data, for example, alphanumeric characters entered into the Regulator by a User via the Keypad, or a stream of data transmitted to the Usage Regulator by the Revenue Management System via wireless communication. A Payment Code conveys to the Usage Regulator that a change in the Usage Regulator operation or state is required, for example, turning on or off certain features and functionality of the regulated Device or otherwise changing its state. In one embodiment, Payment Codes may comprise Activation Codes, Recharge Codes, Unlock Codes, and Reset Codes.

An Activation Code is a particular form of a Payment Code which includes instructions and information that, when interpreted by the microcontroller and logic in the Usage Regulator, will change the status of the Usage Regulator from "Inactive" to "Active". An "Inactive" Usage Regulator means that the Device has not yet been sold to a Customer and thus the Usage Regulator cannot be Recharged, payments cannot be applied, and the Device will not have full functionality. When the Usage Regulator Status is equal to "Active" the Usage Regulator is ready to accept Recharge Codes, Unlock Codes and Reset Codes and take the intended actions as contained in those codes.

A Recharge Code is a particular form of a Payment Code which includes instructions and information that, when successfully interpreted by the microcontroller and logic in the Regulator, will increase the Recharge Value stored in the Regulator and thus enable use of one or more features of the Device. Recharge Codes are unique and encrypted, can only be used on the intended Device, and can only be used once.

An Unlock Code is a particular form of Payment Code which includes instructions and information that, when successfully interpreted by the microcontroller and logic in the Usage Regulator, will cause the Usage Regulator to permanently unlock and/or enable all regulated features and functions of the Device. An Unlock code is issued to a Customer once the Customer has completed full payment for the Device, or otherwise discharged all of his or her responsibilities under a contract with the seller of the Device. Once an Unlock Code has been entered into the Usage Regulator and successfully processed by the Usage Regulator, the Device is completely unlocked. Unlock Codes are unique and encrypted, can be used only on the intended Device, and can be used only once.

A Reset Code is a particular form of Payment Code that includes instructions and information that, when successfully interpreted by the microcontroller and logic in the Usage Regulator, will cause the Usage Regulator to return to Inactive state. This may be necessary if, for example, a customer returns a Device and Usage Regulator to the seller and the parties agree to some form of refund. If the seller wishes to re-sell that particular Device and Usage Regulator to a new customer, it is necessary to reset the Regulator such that all prior payment history is erased and the Regulator is returned to an "as new" state. Reset Codes are unique and encrypted, single use and can only be used on the intended Device.

Figure 4:
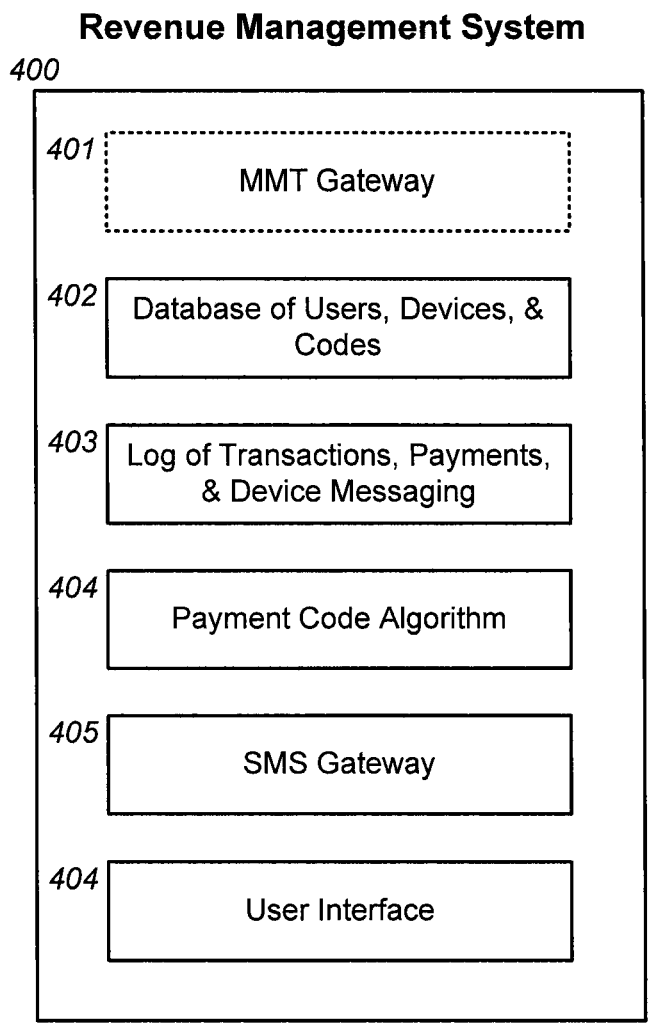
FIG. 4 is a block diagram illustrating a Revenue Management System according to an embodiment.

FIG. 4 illustrates an example Revenue Management in accordance with an embodiment. In one embodiment, the Revenue Management System (box 400) may comprise at least the following, as illustrated in FIG. 4: a Mobile Money Transfer Gateway (box 401); a Database of Customers and Devices (box 402); a log of transactions, payments and messages (box 403); a Payment Code Algorithm (box 404); an SMS and Wireless Communications Gateway (box 405); and User Interfaces (box 404) for various groups of Customers including but not limited to Administrators, Microfinance Institutions, Energy Enterprises and other Financial Partners.

The Mobile Money Transfer Gateway (MMT) (box 401) is a software application that communicates with one or more Mobile Payment System Operators (such as Zain Zap® or Safaricom's M-Pesa®). The Database of Customers and Devices (box 402) is a software database with records of all Customers, Devices, payment histories, purchase prices of devices, and related business rules which apply to individual contracts for each User and/or Device. The log of transactions, payments, and messages is a stored record of all such data in a database (box 403). The Payment Code Algorithm (box 404) is the software application implementing an algorithm for generating unique Payment Codes given various inputs and Device ID. The SMS and Wireless Communications Gateway (box 405) is a combination of software and hardware elements which manages the communication with end-Customers via SMS and/or other wireless communications protocols. The User Interfaces (box 404) are software applications for presenting information to and receiving inputs from Customers and other Users of the Revenue Management System.

A process of progressive purchasing will now be described in reference to FIGS. 5-7. It is assumed that a Customer wishes to purchase a Device from a Company, but is unwilling or unable to pay the full purchase price upfront. A Vendor therefore agrees to sell or lease the Device to the Customer on a progressive purchase basis, i.e., utilizing techniques described herein. A Vendor may be a Company's representative, for example, a retailer or sales agent for the Company. A Vendor may also be a third party engaged to sell (lease) the Device. This purchase arrangement is enabled by the techniques described herein.

Figure 5:
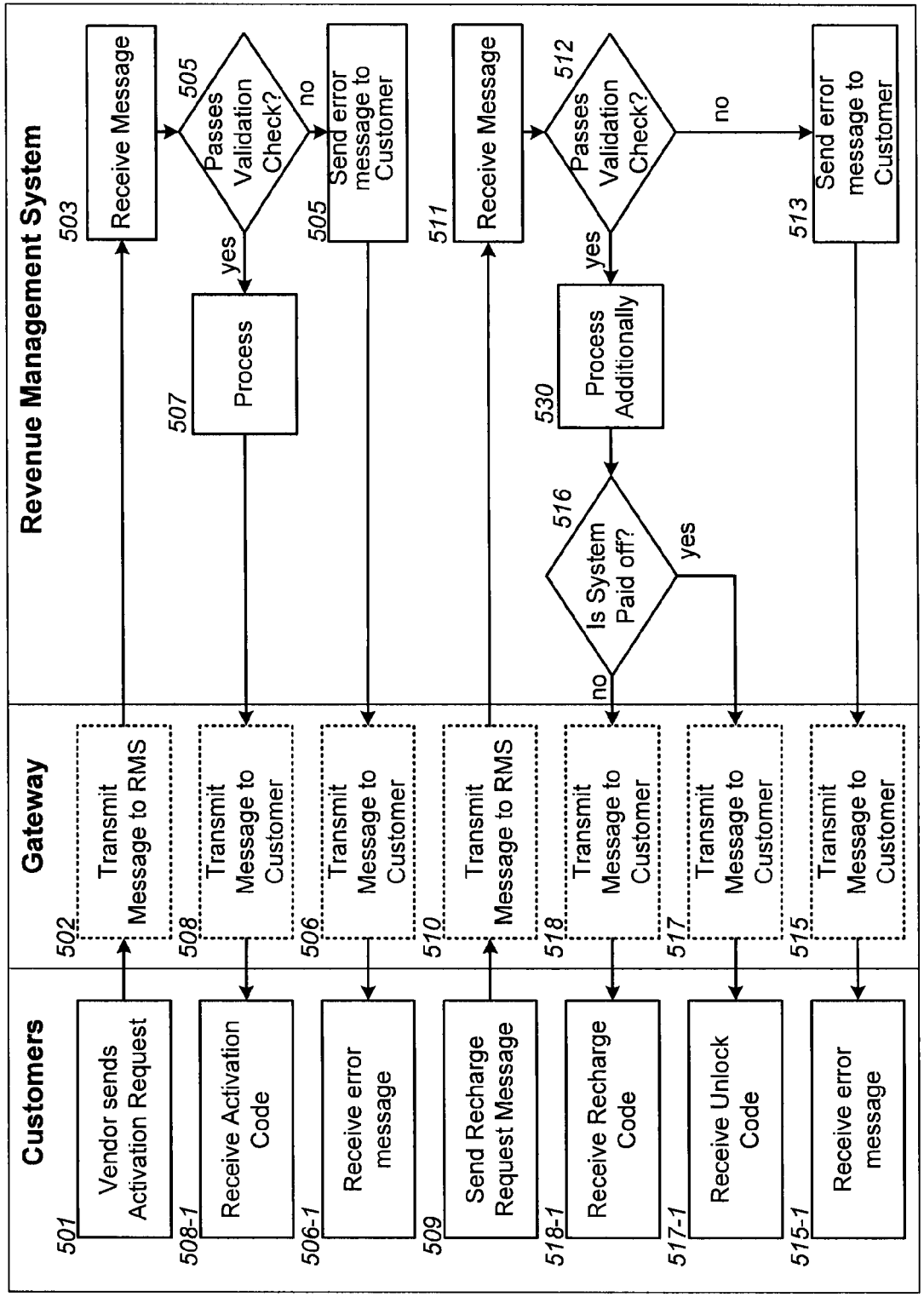
FIG. 5 is a process flow diagram illustrating a method for progressive purchasing implemented according to an embodiment.

FIG. 5 is a process flow diagram illustrating a method for progressive purchasing implemented according to an embodiment. Before the Device can be taken home by the Customer, a nominal payment that acts as sufficient collateral is made between a Customer and a Vendor. The Vendor transmits a specific type of User Request called an Activation Request to the Revenue Management System. In one embodiment, the Vendor may initiate communication by sending an Activation Request (box 501), for example, via a Short Message Service (SMS) (box 502). The Revenue Management System receives and identifies the incoming message (box 503) as an Activation Request and conducts the appropriate validation check (decision box 505). If the message fails the validation check, an error message is transmitted back to the Vendor via the SMS Gateway (box 506). The Vendor receives (box 506-1) the error message.

If the message passes the validation check, the Revenue Management System processes (box 507) the message and transmits (box 508) a Payment Code in the form of a unique single-use Activation Code to the Vendor. The Vendor receives the Activation Code (box 508-1). In one embodiment, the Vendor then types the encrypted Activation code into the Keypad of the Usage Regulator. The Revenue Management System also transmits an activation confirmation message via SMS to both the Vendor and the Customer to inform these users that the Revenue Management System has processed the User Request.

After the Device has been activated the Customer must take further action in order to use one or more features of the Device. The Usage Regulator blocks access to or disables the proper functioning of one or more features of the Device until the Usage Regulator receives properly formatted and valid Recharge Codes, which are a particular form of a Payment Code. Thus, the Customer must access a Recharge Code and can do so only by first making a payment to the Vendor in person or, in an embodiment, via a mobile money transfer system. Once the Customer makes a payment to the Vendor, the Vendor provides to the Customer a Top-Up Code. A Top-Up Code represents proof of purchase. The Customer next transmits a Recharge Request Message (box 509) to the Revenue Management System where it is processed. The Recharge Request Message can be transmitted, e.g., via SMS (box 510) or other wireless communication medium. A properly formatted Recharge Request Message will contain the Top-Up Code and the Device ID for the specific Usage Regulator associated with the Device that is being purchased.

Upon receipt (box 511) of a Recharge Request Message, the Revenue Management System next conducts a validation test on the Recharge Request Message (decision box 512). If the Recharge Request fails the validation test, the Revenue Management System prepares (box 513) and transmits (box 515) an error message to the Customer. The Customer receives the error message (box 515-1). If the Recharge Request passes the validation test, additional processing (box 530) is done by the Revenue Management System as discussed below in greater detail. The Revenue Management System stores a record of every Top-Up Code and the associated currency value of each such code. As part of the process signified by box 530, the Revenue Management System looks up the Top-Up Code in the Revenue Management System database and determines what value it is for. The currency value of the Top-Up Code is next added to the sum total of all payments recorded to have been received for a particular Device ID. Next, the Revenue Management System checks (box 516) to see if the full purchase price for the Device has been fully paid.

If the Device has now been fully paid, the Revenue Management System generates a Payment Code, in the form of an encrypted Unlock Code and transmits to Customer via SMS (box 517). The Customer receives the Unlock Code (box 517-1). If the Device is not paid off in full, the Revenue Management System generates a Recharge Code in the form of a unique and encrypted Recharge Code and transmits to Customer via SMS (box 518). The Customer receives the Recharge Code (box 518-1). The encrypted Payment Code could be transferred from the Vendor to the Customer on paper or via SMS or any other communication medium. In an embodiment, the Customer then types the Payment Code into the Regulator Keypad.

If the Recharge Request passes the validation test, some additional processing (box 530) may be done by the Revenue Management System that will be discussed now in greater detail. Various business rules may be applied to determine one or more of the following: how much to modify the total outstanding balance owed on the system; how much to credit to the Customer as usage time; whether to create and issue a Payment Code to the Customer; what type of Payment Code to issue, and what information and instructions to embed in that Payment Code. The business rules may include the ones described above in reference to FIG. 2. The rules may utilize one or more of the following data: the Customer data, the device ID, the time of day/week/month/year, the frequency of payments, the sum total of payments received, the pattern of payments received, the particulars of the relevant payment plan, the existence of special promotions, and the like. Automatic execution of various pricing plans, promotions and incentives without additional Customer input may be executed by the Revenue Management System. The promotions and incentives may take place during predefined promotion time periods. Examples of business rules that can be effected at process box 530 include, but are not limited to the following:

During a pricing promotion period, customers who add more than a predetermined value (e.g., $5) to their systems could be given a bonus (e.g., 10%) in the Recharge Value. Thus $5 would be added to the balance paid towards the purchase price, but a Payment Code in the form of the Recharge Code (e.g., worth $5.50) would be sent to the Customer.

Customers that make more than two payments (Recharge Requests) in a payment period (e.g., one month) could be rewarded with a fixed or variable percentage bonus in the Recharge Value.

Customers could be sent a unique Recharge Code that must be given away to other customers, thus incentivizing the customer to refer new customers. The referred customer would use that Top-Up Code when making a subsequent payment. The Revenue Management System would only validate that Top-Up Code if it was associated with a Device ID other than that of the original Customer. Customers that refer other customers may be rewarded with a bonus Recharge Value each time the new customer makes a payment.

Customers may be incentivized to make payments on certain days of the week by being offered additional bonuses.

Customers that had previously selected a particular payment plan could receive a bonus (e.g., 20% value) on the Recharge Value while other customers on a different payment plan would receive a bonus (e.g., 15% value) on the Recharge Value sent in the Payment Code.

Customers could be considered members of a "buyers group." For example, if each member of a buyers group makes a payment of a certain amount (e.g., at least $10) within a predetermined time period (e.g., two weeks), then each member is issued a predetermined sum (e.g., $2) in free Recharge Value.

Changes in the price per unit (e.g., Watt) of electricity could be achieved by a Customer that makes a predetermined number (e.g., four) of payments over a predetermined time period (e.g., one month).

Figure 6:
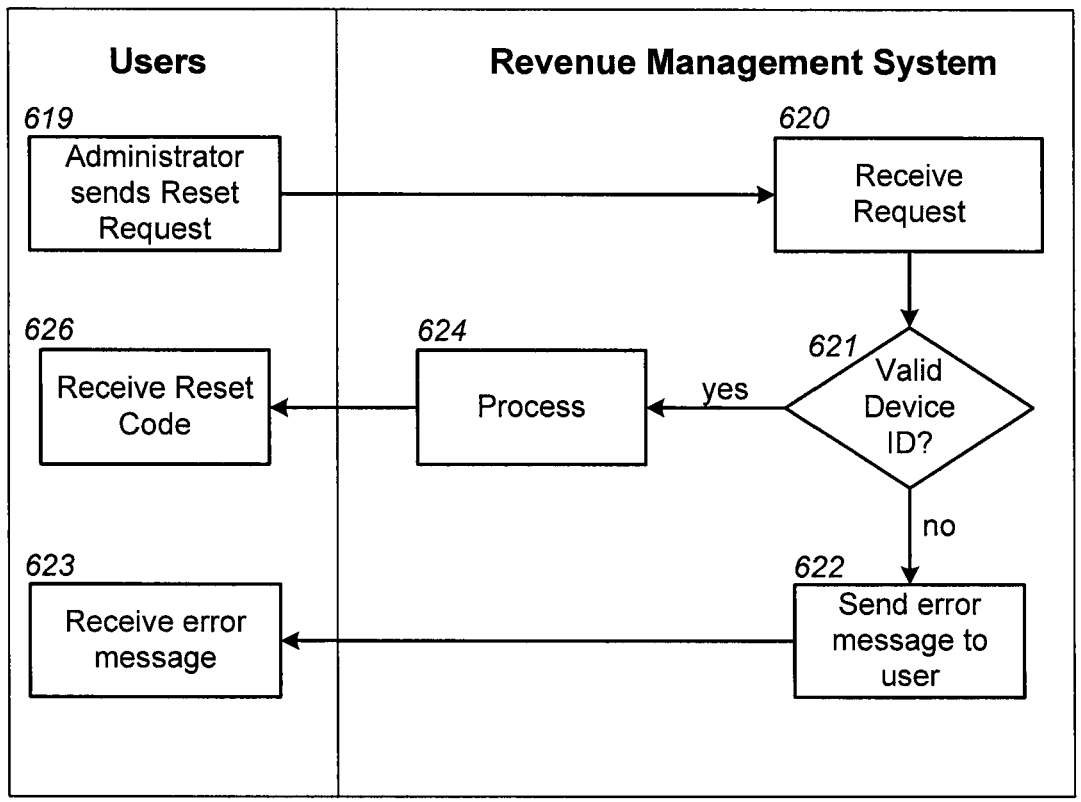
FIG. 6 is a process flow diagram illustrating a method for progressive purchasing implemented according to another embodiment.

FIG. 6 is a process flow diagram illustrating a method for progressive purchasing implemented according to another embodiment. If a Customer and a Vendor agree that the Customer can return a Device such that it can be resold to another Customer, then the Usage Regulator associated with that Device needs to be reset. The Revenue Management System processes such requests as represented in FIG. 6. First, the Revenue Management System Administrator must transmit a Reset Request (box 619) to the Revenue Management System to request a Reset Code, which is one particular form of a Payment Code. In one embodiment, this is done directly in the Revenue Management System environment and does not require the use of the SMS Gateway.

After the Reset Request has been transmitted and received (box 620), the Revenue Management System validates (box 621) the unique Device ID. If the Device ID is invalid, an error message is transmitted (box 622) to the Administrator. The Administrator receives the error message (box 623). If the Device ID is valid, the request is processed (box 624) and a new Payment Code in the form of an encrypted Reset Code is generated and transmitted to a Vendor, the Revenue Management System Administrator, a System Technician, or wirelessly to the Device. The Payment Code (Reset Code) is received (box 626) by a Customer. If the communication medium was not wireless, the encrypted Reset Code may be typed into the Regulator Keypad by a Vendor, Revenue Management System Administrator, or Technician.

In an embodiment, the Customer makes a payment to the Vendor via a third party Mobile Payment System (such as, for example, M-Pesa® or Zain Zap®). A Revenue Management System receives from the Mobile Payment System a confirmation that payment has been received. In an embodiment, the payment could be made at a Vendor by paying to the Vendor and receiving a Scratch Card. The Scratch Card includes a hidden Top-Up Code which can be revealed by scratching away a layer of material. The Customer then sends a message, e.g., an SMS message containing the Top-Up Code and the Customer's Device ID directly to the Revenue Management System. The Revenue Management System takes these inputs and generates a Payment Code in the form of a unique Recharge Code, which as above, is delivered to the Customer via some communication medium.

As discussed above, the Revenue Management System manages the lifecycle of the Usage Regulator including the financial transactions between a specific Customer and a Device provider using a communications medium. The Revenue Management System database maintains relationships between a Customer and a Usage Regulator through the use of unique Customer and Device Identifier Numbers (ID). The Revenue Management System interprets these and other inputs and generates unique encrypted Payment Codes which are communicated to the Customer or directly to the Usage Regulator via a Communications Medium. The Payment Codes are unique and single use and cannot enable any Device other than the specific Device identified by the unique Device ID. The Communications Medium could be an SMS message sent to the Customer's mobile phone or could be as simple as a piece of paper on which is printed the unique Payment Code. In one embodiment, the Communications Medium could be an SMS message or other message delivered wirelessly directly to the Wireless Communications Interface which is part of the Usage Regulator embedded within the Customer's Device which in turn communicates with the Logic Center in the Usage Regulator. In one embodiment, the Wireless Communications Interface could be a GSM or GPRS Chipset.

Figure 7:
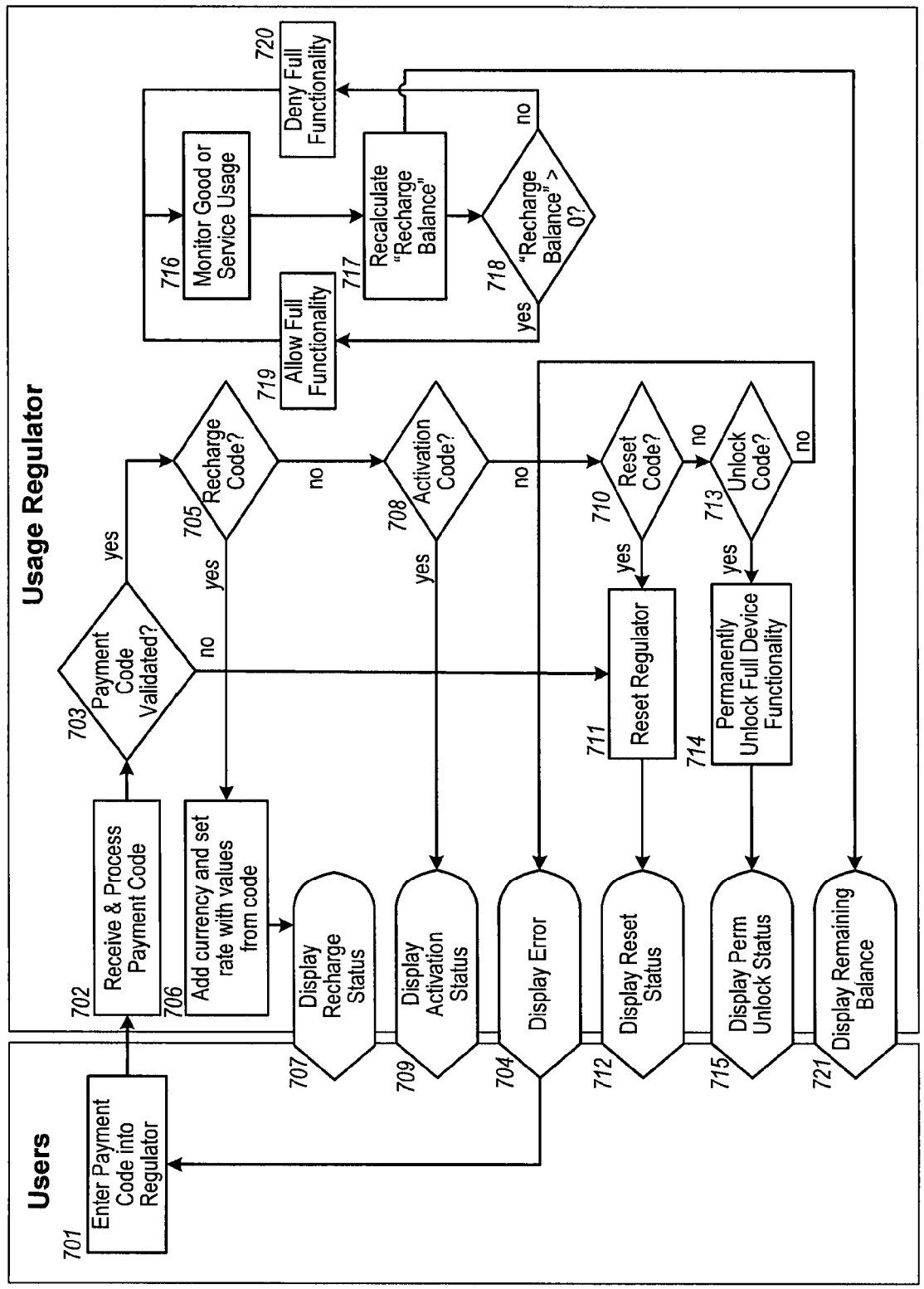
FIG. 7 is a process flow diagram illustrating a process for progressive purchasing and processing a payment by the Usage Regulator according to an embodiment.

FIG. 7 is a process flow diagram illustrating the operation of the Usage Regulator in accordance with an embodiment. In an embodiment, the Usage Regulator meters and measures the amount of electricity drawn by the Customer from a solar power system (Device) such as discussed above in reference to FIG. 2. The process begins at box 701, when the Customer transcribes the Payment Code received from the Revenue Management System into the Regulator by typing it into the Regulator Keypad of the Usage Regulator attached to or embedded in the Device. In another embodiment, the Revenue Management System may send the Payment Code through wireless communication directly to the Usage Regulator. Next, the Usage Regulator processes (box 702) and validates (box 703) the Payment Code. If the Usage Regulator cannot successfully validate the Payment Code, an error message is displayed (box 704) for the Customer on the Usage Regulator Screen. If the Payment Code was successfully validated, the Usage Regulator will next check (box 705) to see if the Payment Code is a Recharge Code.

If the Payment Code is a Recharge Code, a process (box 706) will be initiated to update the stored balance in the Usage Regulator's Data Store. A confirmation message is displayed (box 707) to the Customer via the Usage Regulator Screen. If the Payment Code was determined in Decision Box 705 to not be a Recharge Code, next the Usage Regulator will check (box 708) to see if the Payment Code is an Activation Code. If the Payment Code is an Activation Code then the update Activation Status is displayed (box 709) to Customer via the Usage Regulator Screen. If the Payment Code was determined to not be an Activation Code then the Usage Regulator next tests (710) to see if the Payment Code is of type Reset Code.

If the Payment Code is a Reset Code then a process (box 711) is initiated to reset multiple values stored in the Data Store and to display (box 712) a Reset Status message to the Customer via the Usage Regulator Screen. If, however, the Payment Code was determined to not be a Reset Code, then the Usage Regulator next tests (box 713) to determine if the Payment Code is of the type Unlock Code. If the Payment Code is an Unlock Code, then the Usage Regulator performs the Revenue Management System instructions (box 714) to permanently unlock all the regulated features of the Device. From that point forward, the Device will operate unencumbered. A message is displayed (box 715) to the Customer via the Usage Regulator Screen. If the Payment Code, however, is determined to not be an Unlock Code, then an error message is displayed (box 704) to Customer via the Usage Regulator Screen.

The Logic Center in the Usage Regulator also continuously monitors and regulates the Customer's use of one or more features of the Device, a process represented in FIG. 7. The Sensors in the Usage Regulator sense or meter the usage of one or more features of the Device (box 716). Next, the Usage Regulator conducts a process (box 717) including the recalculation of the Recharge Balance and updating the values stored in the Data Store. In an embodiment, the Usage Regulator calculates the value of the metered usage of the electricity that a Customer draws from the Device. Next the Usage Regulator tests (box 718) to see if the Recharge Balance is greater than zero. If the Recharge Balance is greater than zero, then the Usage Regulator allows (box 719) full functionality of one or more features of the Device.

If at Decision Box 718 the Usage Regulator determines that the Recharge Balance is less than or equal to zero, the Usage Regulator denies (box 720) full functionality of the Device. In either case, the Usage Regulator displays (box 721) the current Recharge Balance and other details of the status of the Device to the Customer via the Regulator Screen. In an embodiment, the Usage Regulator disables the Device such that the Customer is unable to draw electricity from the Device.

The Logic Center in the Usage Regulator communicates with the Usage Regulator Screen to cause the latter to display data about some or all of the following: available Device features, time remaining, usage rate, and other information relevant to the usage and utility of the Device. It is also possible for the aforementioned information to be conveyed to the customer by means other than the Regulator Screen, such as SMS or other electronic means.

In an embodiment, the system may be used as a risk mitigation tool for lenders, such as banks, microfinance institutions, or vendors providing store credit directly to Customers. In this case, the Usage Regulator is attached to the Device and Revenue Management System is managed by the lender, or some party designated by the lender. An illustrative scenario may have a Customer borrow money to purchase a Device (such as a solar power system). The borrower may enter into an agreement with the lender to make a series of regular payments over time to repay the loan. The Usage Regulator may be attached to the Device in such a way so as to control the utility or functionality of the Device, including making the Device non-functioning unless a valid Payment Code has been entered.

Each payment period (weekly, monthly, etc.) a Customer may send a message (e.g., SMS) to the Revenue Management System requesting a new Payment Code. The message may include the unique Device ID of the Regulator attached to the Device. If the Customer has been making his or her payments on time and if no outstanding payment is due, then the Revenue Management System will send (in an embodiment, via SMS) a unique single-use Payment Code to the Customer. If, however, the Customer is in arrears or in default in any way pre-defined by mutual agreement of the borrower and lender, the Revenue Management System will not automatically issue a Payment Code to the Customer. Other messages could be sent to the Customer reminding him or her to make a payment on him or her loan.

Once the full balance of the loan has been paid to lender, the lender may cause the Revenue Management System to send a final permanent Payment Code to the Customer. This code, once entered into the Regulator, may permanently unlock the Device. Depending on how the Usage Regulator is integrated with the Device, it may be possible for the Vendor to visit the Customer's premises and physically remove the Usage Regulator, leaving the Device unencumbered.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or Keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for progressive purchasing of a device including a plurality of ports configured to provide a plurality of functionalities to a customer, the method comprising:
  under the control of one or more computer systems having one or more computer processors executing executable instructions,
    receiving information indicating a payment for a device from a customer;
    determining, by the one or more computer systems having one or more computer processors, a payment pattern by the customer based on a recorded customer payment history and the received information, the payment pattern comprising at least a timing of payments by the customer and a sum total of payments received from the customer;
    identifying, by the one or more computer systems having one or more computer processors, at least one power supply functionality of the device to be enabled in the device based on the determined payment pattern at least in part by determining that the sum total of payments received from the customer is less than an amount owned and the timing of payments by the customer meets a power supply functionality enabling criteria; and
    enabling, by the one or more computer systems having one or more computer processors, the identified at least one power supply functionality of the device at least in part by selecting the at least one power supply functionality of the device from a plurality of power supply functionalities associated with the device such that less than all of the plurality of power supply functionalities associated with the device are selected and including providing maximum current draw at a first predetermined power level with a first port of the plurality of ports, providing maximum current draw at a second predetermined power level with a second port of the plurality of ports, and providing combined maximum current draw at a third predetermined power level with the plurality of ports, wherein the first predetermined power level, the second predetermine power level and the third predetermined power level are distinct and wherein each of the plurality of power supply functionalities correspond to a distinct provision of electric power to one or more output ports.

2. The computer-implemented method of claim 1, wherein the payment history includes proofs of payment received from the customer over a period of time, and wherein the payment pattern comprises at least a frequency of payments by the customer and a sum total of payments received from the customer.

3. A computer system for progressive purchasing of a device including a plurality of ports configured to provide a plurality of functionalities to a customer, comprising:
   at least one processor; and
   a memory having computer-executable instructions that, when executed on the at least one processor, cause the computer system to, at least:
      receive information indicating a payment for a device from a customer;
      determine a payment pattern by the customer based on a recorded customer payment history and the received information, the payment pattern comprising at least a timing of payments by the customer and a sum total of payments received from the customer;
      identify at least one power supply functionality of the device to be enabled in the device based on the determined payment pattern at least in part by determining that the sum total of payments received from the customer is less than an amount owned and the timing of payments by the customer meets a power supply functionality enabling criteria; and
      enable the identified at least one power supply functionality of the device at least in part by selecting the at least one power supply functionality of the device from a plurality of power supply functionalities associated with the device such that less than all of the plurality of power supply functionalities associated with the device are selected and including providing maximum current draw at a first predetermined power level with a first port of the plurality of ports, providing maximum current draw at a second predetermined power level with a second port of the plurality of ports, and providing combined maximum current draw at a third predetermined power level with the plurality of ports, wherein the first predetermined power level, the second predetermine power level and the third predetermined power level are distinct and wherein each of the plurality of power supply functionalities correspond to a distinct provision of electric power to one or more output ports.

4. The computer-implemented method of claim 1, wherein the payment pattern comprises a frequency of payments by the customer and identifying the at least one power supply functionality of the device to be enabled in the device based on the payment pattern comprises determining that the frequency of payments by the customer meets a power supply functionality enabling criteria.

5. The computer-implemented method of claim 1, further comprising providing a promotional bonus based at least in part on the payment pattern.

6. The computer-implemented method of claim 5, wherein the promotional bonus comprises identifying and enabling additional power supply functionality of the device.

7. The computer-implemented method of claim 5, wherein the identified at least one power supply functionality of the device is enabled for a pre-determined time period and the promotional bonus comprises extending the time period.

\* \* \* \* \*